Patented Apr. 7, 1925.

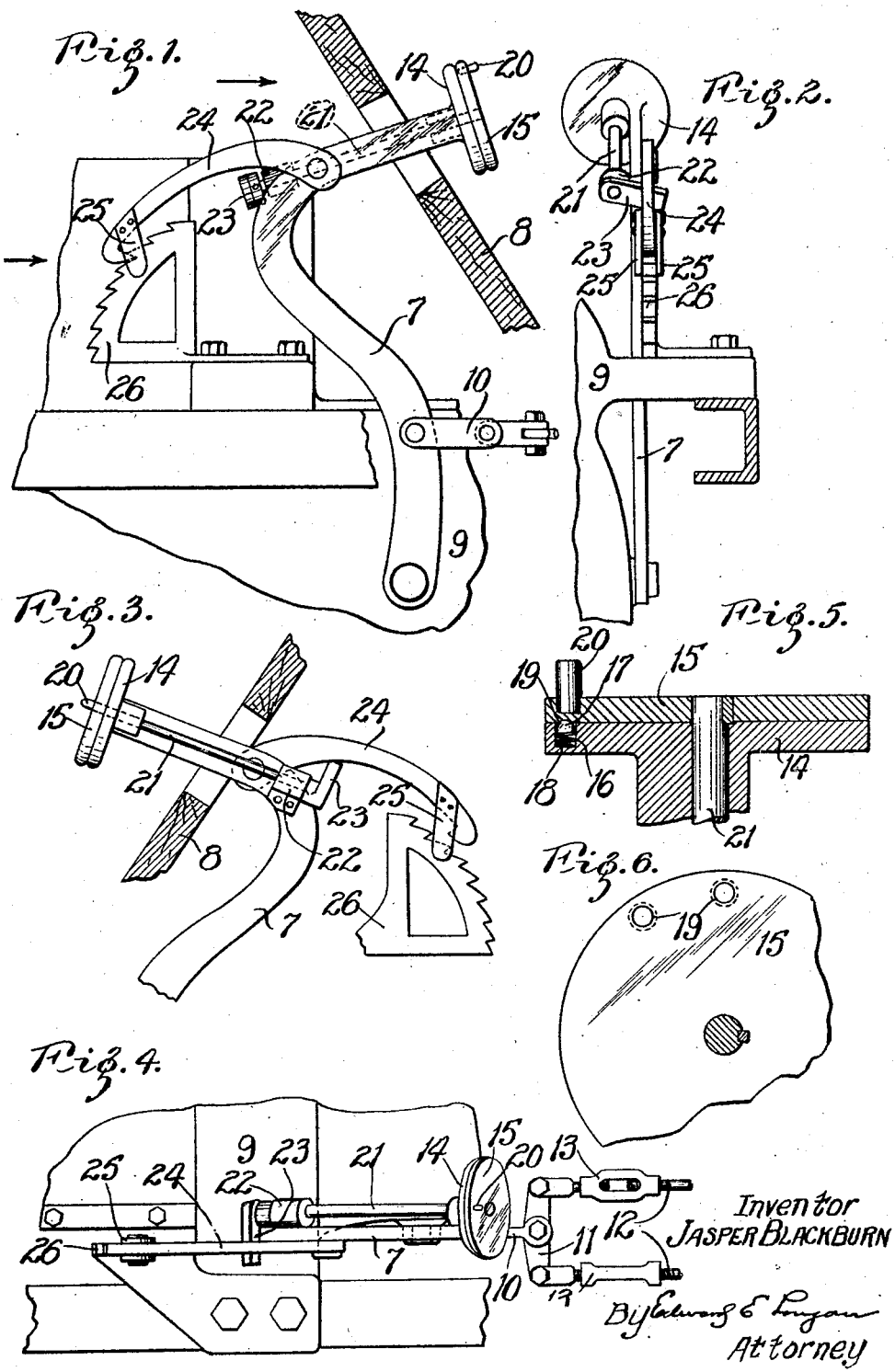

1,532,870

UNITED STATES PATENT OFFICE.

JASPER BLACKBURN, OF WEBSTER GROVES, MISSOURI.

BRAKING DEVICE.

Application filed September 25, 1923. Serial No. 664,675.

*To all whom it may concern:*

Be it known that I, JASPER BLACKBURN, a citizen of the United States, and resident of the city of Webster Groves, county of St. Louis, and State of Missouri, have invented certain new and useful Improvements in Braking Devices, of which the following is a specification containing a full, clear, and exact description, reference being had to the accompanying drawings, forming a part thereof.

My invention relates to improvements in braking devices and has for its primary object a braking device by means of which brakes can be set simultaneously and held in such position, or in which the brakes may be set and retained in that position only as long as pressure is applied on the lever.

A further object is to construct a braking device in which the brake lever is provided with a pivoted hook, which hook can be lowered in order to hold the brakes in set position when desired, or which can be raised so that the brakes will remain in such position only as long as pressure is applied to the lever.

In the drawings:

Fig. 1 is a side elevation of my device with the hook in holding position;

Fig. 2 is an elevation of the same viewed in the direction of the arrow of Fig. 1;

Fig. 3 is a fragmental side elevation viewed from the reverse side of Fig. 1;

Fig. 4 is a top plan view of the device;

Fig. 5 is an enlarged fragmental view of the upper portion of the brake lever, and Fig. 6 is a bottom plan view of the rotating plate made use of.

My device is primarily intended for use on motor vehicles although the same may be installed on other devices.

In the construction of my device for automobiles, I employ a brake lever 7 which extends through the toe board 8 of an automobile. This brake lever is pivoted at its lower end preferably to the engine frame 9. Secured to the lever 7 is a yoke 10 to which is pivotally connected a link or equalizer 11. To the ends of the equalizer are connected the brake rods 12 which lead to any suitable style of brake. These rods are provided with turn-buckles 13 so as to permit the adjustment of the brakes. The upper end of the brake lever is provided with a plate 14 on which is rotatably secured a second plate 15. The plate 14 is provided adjacent its periphery with a recess 16 in which is located a ball 17. This ball is actuated by means of a coil spring 18 which forces it into recesses 19 formed in the rotating plate 15. The rotating plate is also provided with an extension or pin 20 by means of which the same can be readily rotated.

It will be noted from Fig. 2 that the plate 14 is eccentrically integral with the brake lever. Secured to the plate 15 and extending through the plate 14 is a shaft 21, this shaft extends through a bearing 22 carried by the brake lever, and to the free end of the shaft is secured an arm or cam 23. Pivotally carried by the brake lever 7 is a hook 24, and located on each side of the free ends of the hook are guide plates 25. Which guide plates are adapted to straddle a toothed segment 26 which is carried preferably by the engine frame. The plates 25 being for the purpose of preventing the hook from falling to one side of the segment 26.

When it is desired to operate my device as a service brake, the plate 15 is so rotated that the hook is raised out of engagement with the segment 26. The hook is maintained in this raised position by reason of the ball 17 being forced into one of the recesses 19 on the rotating plate. Pressure on the free end of the lever 7 in this instance, exerted by the foot, will set the brakes but upon the pressure being withdrawn, the lever will come to its original position and release the brakes.

When it is desired to keep the brakes set, as when the vehicle is left standing unattended, the plate 15 is rotated so that the other recess 19 will come in alinement with the ball. This lowers the arm 23 and allows the hook to sink downward so that it can engage with the teeth on the segment 26. When in this position any forward movement of the brake lever will allow the hook to ride over the surface of the segment and engage with certain of the teeth and hold the lever in depressed position. When it is desired to release the brake, the plate 15 is again turned so as to raise the hook 24 when the device can return to its original position.

While I have shown my device as secured to the engine frame of an automobile, I do not desire to limit myself to this precise construction because the various parts may also be attached to the frame on the chassis and accomplish the same results.

Having fully described my invention, what I claim is:—

1. A braking device comprising a brake lever, brake rods carried by said lever, a hook pivotally carried by said lever, a toothed segment located adjacent said brake lever, and means carried by said brake lever and contacting with said hook for raising and maintaining said hook out of engagement with said segment, said means adapted to be moved out of contact with said hook for lowering the same into contact with said segment, whereby said brake lever is held in set position.

2. A braking device comprising a brake lever, a plate rotatably mounted on the free end thereof, means for rotating said plate, a hook pivotally secured to the brake lever, a toothed segment located adjacent the brake lever and in the path of travel of said hook, and means operable by said plate whereby said hook can be raised and lowered out of and into engagement with the segment.

3. A braking device comprising a brake lever, a plate rotatably mounted on the free end thereof, means for rotating said plate, a hook pivotally secured to the brake lever, a toothed segment located adjacent the brake lever and in the path of travel of said hook, and means operable by said plate whereby said hook can be raised and lowered out of and into engagement with the segment, means carried by the free end of said hook for holding the same in alinement with the segment.

4. A braking device comprising a brake lever, a hook pivotally carried thereby, a toothed segment located in the path of travel of said hook, a plate pivotally carried by said lever, a cam operated by said plate whereby said hook can be moved into and out of engagement with said segment by the rotation of said plate, and means for holding said hook in set position.

5. A braking device comprising a brake lever, a plate rotatably mounted on the free end thereof, means for rotating said plate, a hook pivotally secured to the brake lever, a toothed segment located adjacent the brake lever and in the path of travel of said hook, means operable by said plate whereby said hook can be raised and lowered out of and into engagement with the segment, and means whereby said hook can be retained in raised position.

6. A braking device comprising a brake lever, a plate rotatably mounted on the free end thereof, means projecting from said plate for rotating the same, a hook pivotally secured to the brake lever, a toothed segment located adjacent the brake lever in the path of travel of said hook, means operable by the rotation of said plate whereby said hook can be raised out of and lowered into engagement with said segment, means for preventing the accidental rotation of said plate, and means carried by the free end of said hook for holding the same in alinement with the segment.

7. The braking device of claim 2 in which means is provided for preventing the accidental rotation of the plate.

8. The braking device of claim 3 in which a spring actuated means is employed for preventing accidental rotation of the plate.

In testimony whereof, I have signed my name to this specification.

JASPER BLACKBURN.